United States Patent Office 2,700,599
Patented Jan. 25, 1955

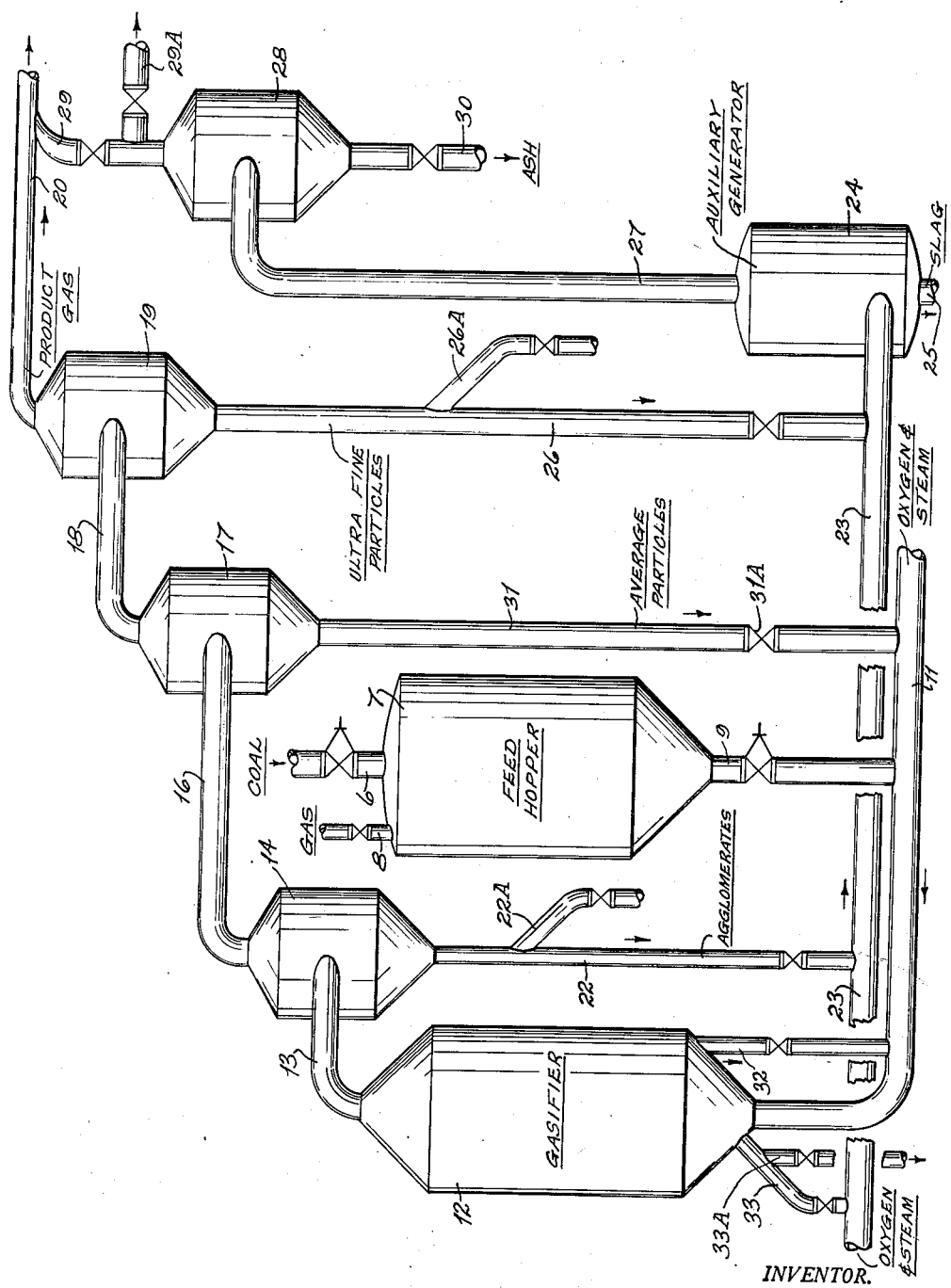

2,700,599

GASIFICATION OF SOLID CARBONACEOUS MATERIALS

John C. Kalbach, Bronx, N. Y., assignor to Hydrocarbon Research, Inc., New York, N. Y., a corporation of New Jersey Application April 30, 1949, Serial No. 90,646

9 Claims. (Cl. 48—197)

This invention relates to a process for the gasification of a solid carbonaceous material. The process of the invention is applicable to the gasification of coke, oil shale, and coals of various grades including anthracite, lignite and bituminous coals. It is particularly useful for the production of gases containing carbon monoxide and hydrogen suitable for use as fuel gas or as feed gas for the synthesis of hydrocarbons, oxygenated compounds, ammonia, and the like.

The fluidized solids technique has been applied to processes for the gasification of carbonaceous materials. For example, coal in finely divided form may be reacted in a fluidized bed with an oxidizing gas for gasification to any desired extent. Mixtures of substantially pure oxygen and steam are most suitable for gasification. It is known also that carbonaceous materials may be effectively reacted in a fluidized bed with hydrogen to produce a gas rich in hydrocarbons and suitable as a fuel gas.

Elimination of ash from a fluidized bed reaction zone has always been a problem. In order to prevent the build-up of ash in a fluid bed gasification zone it is necessary that the solids removed from the gasification zone contain a total quantity of ash equivalent to the total quantity in the solids fed to the gasification zone. Since there is good mixing in a fluid bed, the solids withdrawn normally represent an average composition of the solids in the bed or fluidized mass and can contain no less carbon than is required to support the reaction at a reasonable rate under gasification conditions. On the other hand, it is desirable to gasify as much of the carbon as possible. It may be desirable, for example, to maintain at least 50 percent carbon by weight in the solids in the fluid bed. Normally the ash must be discarded from the bed by removing solid material of average composition in an amount sufficient to offset the rate of ash introduction in the fresh feed.

I have found that in the gasification of carbonaceous materials in a fluidized bed agglomerates are formed in the gasifier presumably due to localized overheating. I have also found that these agglomerate particles, surprisingly, consist mostly of ash. By separation of these particles from the solid material undergoing gasification, ash may be eliminated from the gasification zone in a novel and efficient manner. Furthermore, a certain percentage of the feed material comprises or is converted into ultrafine particles either by disintegration of the feed material or by consumption of the carbon content of the feed, leaving a fly ash which is readily entrained in the product gas stream. By separating both agglomerate and ultrafine particles from the particles undergoing gasification in the fluid bed, it is possible to operate the fluid bed with a carbon content of 50 percent, for example, and to remove the ash in a solid by-product containing only 25 percent carbon, for example.

In accordance with my invention the solid carbonaceous feed material is reduced to a particle size suitable for fluidization, generally less than ¼ inch in diameter and preferably less than 0.1 inch in diameter and charged into a fluidized bed of particles undergoing gasification. The particles of carbonaceous material are subjected to partial gasification in the fluidized bed, the extent of which varies with different particles and may range from distillation of volatilizable constituents to substantially complete removal of carbon. The particles of residual carbonaceous material or char are removed continuously from the fluidized bed and classified according to size. Average size particles, i. e., particles of a size range corresponding to the particle sizes in the feed, are returned to the gasification reactor in admixture with fresh feed material. Oversized particles or particles larger than the largest particles in the feed, for example, particles twice the maximum particle size of the feed, and ultrafine particles or particles smaller than about 300 mesh are separated from the char and eliminated from the recycle stream.

In a preferred embodiment of the invention, the particles of feed material are charged into the bottom of a gasification reactor into an upflowing fluidized mass of particles undergoing gasification with steam and oxygen. Alternatively, gasification may be carried out with hydrogen as the gaseous reactant. The gasification reactor is operated full of solid particles at all times and with gas velocities sufficient to agitate the particles in the reactor and cause an upward movement therethrough while maintaining the particles in a state of dense phase fluidization. The residual particles are passed out of the reactor with the effluent gas stream and classified according to size. The ultrafine and over-sized particles may be used as fuel or passed to an auxiliary gasification zone where they are reacted with an oxygen-containing gas under conditions such that substantially all of the carbon value of the particles is utilized.

The agglomerates and ultrafine particles may be used as fuel or may be reacted with oxygen under conditions effective for consumption of substantially all of the carbon content of these particles to produce a product gas comprising carbon monoxide and hydrogen. As an added advantage, the removal of these outsized particles from the reactor results in more uniform fluidization of the bed of carbonaceous material undergoing reaction.

Without wishing to limit my invention in any way, I have postulated two possible explanations for the appearance of the low carbon content agglomerate particles in fluid bed gasification. First, the agglomerate particles may result from the agglomeration of ash particles in localized hot spots in the fluid bed. Second, the high ash content agglomerate particles may be a secondary effect of the agglomeration of the solid feed material; such agglomerates tend to stay in the bottom of the bed, due to their higher settling rate, and by a continuous burning-off and building-up process might gradually be converted to high ash content oversize particles. In any event, the oversize particles, i. e., particles larger than the feed particles, are mainly ash and provide a basis for elimination of substantial quantities of ash with low carbon loss by the present process.

An object of this invention is to provide an improved process for the gasification of a solid carbonaceous material.

A primary object is to provide a fluidized process for gasifying solid carbonaceous material in which the ash is discarded from the fluidized mass undergoing gasification as a stream of solids having a higher ash content than that of the fluidized mass.

A further object is to provide a method for maintaining optimum fluidizing and reaction conditions in a fluidized gasifier for solid carbonaceous material.

A further object is to provide a process which is particularly applicable to the gasification of coke, coals, and oil shale.

Another object is to provide an improved process for the generation of carbon monoxide and hydrogen from a solid carbonaceous material.

Other objects and advantages will be apparent from the following detailed description and the accompanying drawing.

The particles of feed material charged to the gasification reactor may be either caking or non-caking in character. Caking coals may be used in the present process by recycling a sufficient volume of the average sized particles of char to substantially curtail agglomeration. The ratio of char to fresh feed may vary within the range of from about 3 parts char by weight per part of fresh feed to about 10 parts char per part of feed. A weight ratio of char to feed of about 5:1 is generally satisfactory.

In the description of the present invention, reference is made to coal as the carbonaceous material undergoing gasification. It will be understood that coal is used only as a specific preferred example and that the method is not limited to coal as the feed material.

The drawing is a diagrammatic elevational view illustrating a preferred mode of conducting the process of this invention.

With reference to the drawing, ground coal is supplied to the system through line 6 into a feed hopper 7. An inert gas may be supplied to line 8 to maintain a positive pressure in the hopper. The gas also serves as an inert blanket which eliminates explosion hazards in the feed hopper. The particulate coal is fed from the hopper through line 9 into conduit 11.

Reactant gases, suitably oxygen and steam, enter the system through line 11 and are admixed with the feed from hopper 7. The particles of coal are suspended in the reactant gases and transported through line 11 into the gasifier 12 wherein the reaction takes place at an elevated temperature. An upflowing fluidized mass of particles of feed coal and resulting char is maintained within the gasifier. The reactant gases serve to agitate, or fluidize, the solid particles and cause upflow of the solid particles through the reactor.

The product gas from the gasifier is discharged through line 13 into a separator 14 wherein the oversize particles or agglomerates are separated from the gas stream. The gas stream, containing the remaining solid particles, is passed through line 16 into a second separator 17 wherein the average size particles are separated therefrom. The gas stream containing ultrafine particles in suspension is then passed through line 18 to a third separator 19 wherein these particles are separated from the gas. The resulting product gas, substantially free from solids, is discharged through line 20.

Separators 14, 17 and 19 may take any suitable form and may be combined into one piece of equipment. Cyclone separators are generally suitable for effecting separation of solid particles from a gas stream. An electrical or supersonic precipitator may be utilized for removal of the ultrafine particles from the product gas. Suitable separators and classifiers are known in the art of handling solid materials.

The agglomerates, or oversized particles, from separator 14 are discharged through line 22 into line 23. A gas, suitably a mixture of oxygen and steam, is supplied to line 23 into admixture with the particles from line 22. The gas stream serves to convey the solid particles into an auxiliary generator 24. Alternatively, the agglomerates may be removed as a by-product through line 22A. Similarly, the ultrafine particles are discharged from separator 19 through line 26 into line 23 and conveyed into the generator 24, or discharged through line 26A as desired.

The gas generator 24 is preferably a generator of the burner type wherein the particles are reacted with sufficient oxygen for substantially complete consumption of their carbon content. Molten slag is discharged from the generator 24 through line 25.

The gas from generator 24 is passed through line 27 to a separator 28. Entrained solid particles, substantially fly ash, are separated from the gas stream by the separator which may suitably be a cyclone separator. The resulting gas may be discharged through line 29 into line 20 to supplement the product gas from gasifier 12 or separately discharged through line 29A. Ash is discharged from separator 28 through line 30.

Particles of char of average size from separator 17 are discharged through line 31, provided with a control device 31A, and passed into admixture with the particles of fresh feed in conduit 11. The mixture of fresh feed and recycled char passes into the reactor. The recycle char may be supplemented by withdrawal of char directly from gasifier 12 through line 32.

Line 33, connected to the base of gasifier 12, may be used to withdraw large agglomerates that settle out in the gasifier. These agglomerates may be transported by the gases flowing through line 23 into the auxiliary generator 24 or discharged through line 33A.

Gasification with oxygen and steam in the gasification zone preferably is carried out at a temperature within the range of about 1600–2000° F. and at a pressure within the range of from about 200 to about 500 pounds per square inch gauge. Generally a pressure within the range of from about atmospheric to about 800 pounds per square inch gauge may be used. The auxiliary generator may be operated at a temperature within the range of from about 2000 to about 2600° F. and at a pressure corresponding to that in gasifier 12 or at a lower pressure.

It will be obvious that various economies may be effected by utilizing heat contents of the various streams of gases and solids. This may be accomplished, for example, by passing hot streams in heat exchange with cooler streams or by utilizing heat from the hot gases or solids to generate steam. These various expedients are known in the art and may be resorted to without departing from the scope of the present invention.

The product gas discharged through line 20 may be treated to separate sulfur compounds, carbon dioxide and other impurities therefrom, as is known in the art. The resulting gases may be used as a source of feed gas for the synthesis of hydrocarbons after suitable purification and adjustment of the relative proportions of carbon monoxide and hydrogen. Alternatively the gases may be used as fuel gas and may be upgraded in heating value by methanation or by enrichment with hydrocarbons.

Obviously many modifications and variations of the invention, as hereinbefore set forth, may be made without departing from the spirit and scope thereof and, therefore, only such limitations should be imposed as are indicated in the appended claims.

I claim:

1. A process for the gasification of a solid carbonaceous material containing volatilizable constituents which comprises admixing particles of carbonaceous feed material of a fluidizable size range containing volatilizable constituents with particles of char resulting from gasification of said feed material and having substantially the same size range as the particles of feed material, passing the resulting mixture into a dense phase fluidized mass of solid carbonaceous particles in a gasification reaction zone, passing a reactant gas under reaction conditions upward through said fluidized mass whereby a gasification reaction takes place between said reactant gas and said carbonaceous material producing a product gas and char of various particle sizes, discharging the resulting product gas from the reaction zone, withdrawing a portion of said char of various particles sizes from said reaction zone, separating from said portion agglomerated oversized particles larger than the largest particles in said feed material, separating from said portion particles of the same size range as the particles of feed material, separating from said portion ultrafine particles smaller than the particles of feed material, and recycling only the particles of the same size as said feed material to the reaction zone into admixture with the fresh feed material.

2. A process as defined in claim 1 wherein the portion of char withdrawn is discharged from the reaction zone in the product gas stream.

3. A process as defined in claim 1 wherein the reactant gas consists essentially of a mixture of oxygen and steam.

4. A process as defined in claim 1 wherein the reactant gas consists essentially of hydrogen.

5. A process for the gasification of a solid carbonaceous material containing volatilizable constituents which comprises admixing particles of carbonaceous feed material of a fluidizable size range containing volatilizable constituents with particles of char resulting from gasification of said feed material and having substantially the same size range as the particles of feed material, passing the resulting mixture into a dense phase fluidized mass of solid carbonaceous particles in a gasification reaction zone, passing a reactant gas under reaction conditions upward through said fluidized mass whereby a gasification reaction takes place between said reactant gas and said carbonaceous material producing a product gas and char of various particle sizes, discharging the resulting product gas from the reaction zone, withdrawing a portion of said char of various particle sizes from said reaction zone, separating from said portion agglomerated oversized particles larger than the largest particles in said feed material, separating from said portion particles of the same size range as the particles of feed material, separating from said portion ultrafine particles smaller than the particles of feed material, and passing the oversized and ultrafine particles to a second reaction zone wherein they are subjected to further gasification with oxygen and steam under reaction conditions such that substantially all of the carbon content of said fractions is reacted.

6. A process as defined in claim 5 wherein the temperature in said first-mentioned reaction zone is within the range of from about 1600° to about 2000° F., the temperature in said second reaction zone is within the range of from about 2000° F. to about 2600° F., and the pressure in said reaction zones is within the range of from about 200 to about 500 pounds per square inch gauge.

7. In a process for the treatment of a solid carbonaceous material with a reactant gas under reaction conditions wherein particles of said carbonaceous material of a fluidizable size range are maintained as a dense phase fluidized mass in a closed reaction zone by the action of a reactant gas and product gas passing upward therethrough whereby said product gas and a char residue of various particle sizes are obtained, the improvement which comprises selectively eliminating ash from the reaction zone by continuously withdrawing a portion of said mass comprising char of various particle sizes from said reaction zone, separating from said portion agglomerated solid particles having an average diameter larger than the particles of the fresh feed, separating from said portion solid particles of the same size range as the particles of the fresh feed, separating from said portion solid particles smaller than the particles of the fresh feed, and returning only the particles of the same size range as the particles of the fresh feed to the reaction zone into admixture with the particles of the fresh feed.

8. A process as defined in claim 7 wherein the solid carbonaceous material is gasified in the reaction zone by reaction with oxygen and steam.

9. A process as defined in claim 7 wherein particles of solid carbonaceous material and reactant gas are supplied to the bottom of the reaction zone into said dense phase fluidized mass and the portion of said mass withdrawn from said reaction zone is discharged together with said product gas from the top of the reaction zone.

References Cited in the file of this patent

UNITED STATES PATENTS

| 1,718,830 | Nielsen et al. | June 25, 1929 |
| 1,913,968 | Winkler | June 13, 1933 |
| 2,432,135 | Barr | Dec. 9, 1947 |

FOREIGN PATENTS

| 301,975 | Great Britain | Dec. 13, 1928 |

OTHER REFERENCES

Bureau of Mines, "Information Circular 7415," November 1947, page 28.